US012628727B2

(12) United States Patent
Dhobale et al.

(10) Patent No.: US 12,628,727 B2
(45) Date of Patent: May 19, 2026

(54) SEEDING ROW UNIT HAVING A PRIMARY ACTUATOR TO ADJUST DEPTH AND TO RAISE AND LOWER THE SEEDING ROW UNIT

(71) Applicant: DEERE & COMPANY, Moline, IL (US)

(72) Inventors: Dnyanesh Dhobale, Pune (IN); Elijah B. Garner, Bettendorf, IA (US); Kamalakannan Natarajan, Pune (IN)

(73) Assignee: Deere & Company, Moline, IL (US)

( * ) Notice: Subject to any disclaimer, the term of this patent is extended or adjusted under 35 U.S.C. 154(b) by 991 days.

(21) Appl. No.: 17/526,267

(22) Filed: Nov. 15, 2021

(65) Prior Publication Data

US 2023/0148469 A1     May 18, 2023

(51) Int. Cl.
A01C 7/20          (2006.01)
A01C 5/06          (2006.01)
(52) U.S. Cl.
CPC .............. A01C 7/203 (2013.01); A01C 5/064 (2013.01); A01C 7/205 (2013.01)
(58) Field of Classification Search
CPC ................................ A01C 7/203; A01C 7/205
See application file for complete search history.

(56) References Cited

U.S. PATENT DOCUMENTS 2,341,795 A     2/1944   Kriegbaum et al.
2,611,331 A     9/1952   O'Neil 2,920,587 A     1/1960   Shriver
3,362,361 A     1/1968   Morrison, Jr.
3,491,709 A     1/1970   Fleischer et al.
3,512,489 A     5/1970   Coldren et al.
4,275,671 A     6/1981   Baker
4,760,806 A     8/1988   Bigbee et al.
(Continued)

FOREIGN PATENT DOCUMENTS

AU          2010201330 A1  *  3/2011   ............. A01C 7/203
CA             3003996 A1  *  11/2018   ........... A01B 63/111
(Continued)

OTHER PUBLICATIONS

Extended European Search Report and Written Opinion issued in European Patent Application No. 22200301.4, dated Mar. 29, 2023, in 09 pages.

*Primary Examiner* — Alicia Torres
(74) *Attorney, Agent, or Firm* — Taft Stettinius & Hollister LLP; Stephen F. Rost

(57)          ABSTRACT

A row crop planter including a frame, a seed bin supported by the frame and configured to hold seeds, and a plurality of agricultural row units coupled to one or more seed bins. Each of the row units includes a seed deposit assembly, including a disk to cut a furrow in the soil, gage wheel, and a seed deposit chute to direct seeds into the furrow. A bar linkage is operatively connected to the seed deposit assembly. A downforce actuator is operatively connected to the bar linkage and applies a force to the disk and to the gage wheel, to cut the furrow in the soil. A primary actuator is operatively connected to the bar linkage, wherein the primary actuator raises and lowers the seed deposit assemblies, and moves the disk into the soil to cut the furrow at a depth determined by the primary actuator and the gage wheel.

17 Claims, 10 Drawing Sheets

(56)                    References Cited

U.S. PATENT DOCUMENTS

| | | | | |
|---|---|---|---|---|
| 4,796,550 | A | 1/1989 | Van Natta et al. | |
| 4,932,340 | A | 6/1990 | Benzel | |
| 5,140,917 | A | 8/1992 | Swanson | |
| 5,398,771 | A * | 3/1995 | Hornung | A01C 7/203 |
| | | | | 172/635 |
| 5,595,130 | A | 1/1997 | Baugher et al. | |
| 5,727,638 | A | 3/1998 | Woodrich et al. | |
| 6,032,593 | A | 3/2000 | Wendling et al. | |
| 7,387,077 | B1 * | 6/2008 | Truax | A01C 7/205 |
| | | | | 111/167 |
| 8,186,287 | B2 * | 5/2012 | Schilling | A01C 7/203 |
| | | | | 172/578 |
| 10,548,260 | B2 * | 2/2020 | Bassett | A01B 79/005 |
| 2008/0093093 | A1 * | 4/2008 | Sheppard | A01B 61/046 |
| | | | | 172/2 |
| 2017/0079193 | A1 * | 3/2017 | Sheppard | A01C 7/205 |
| 2020/0359546 | A1 | 11/2020 | Ptacek et al. | |

FOREIGN PATENT DOCUMENTS

| | | | | |
|---|---|---|---|---|
| DE | 19644751 | A1 | 5/1997 | |
| EP | 1391147 | B1 | 11/2005 | |
| WO | WO-2009134144 | A1 * | 11/2009 | A01B 63/1145 |

* cited by examiner

1

SEEDING ROW UNIT HAVING A PRIMARY ACTUATOR TO ADJUST DEPTH AND TO RAISE AND LOWER THE SEEDING ROW UNIT

FIELD OF THE DISCLOSURE

The present disclosure relates to an agricultural planter, and in particular, to a seeding row unit for an agricultural planter.

BACKGROUND

An agricultural planter such as a row crop planter places seeds in the ground at a desired depth within a trench formed in soil. Some agricultural planters are capable of depositing fertilizer at the same time as seeding. The row crop planter is typically pulled by a tractor, or other work vehicle, and includes a plurality of seeding row units, that are aligned side by side to form on a common frame a multi-row crop planter. The row units of the multi-row crop planter are aligned substantially parallel to the travel direction of the tractor when being pulled through a field.

Each seeding row unit includes a depth adjustment mechanism to set the depth at which the seeds are planted. The depth at which seed should be planted is frequently a function of seed type, and other environmental conditions, such as soil composition, moisture levels, weather predictions, and the soil property in which the seed is being placed. Seed depth is set by a manual adjustment of a depth adjustment mechanism, such as a handle, on each seeding row unit. Due to the large number of seeding row units, an adjustment for all seeding row units on a large multi-row crop planter is very time consuming. In this type of planter, each actuating mechanism for each seeding row unit, that raises and lowers the seeding row unit to change the depth at which the seed is planted, is idle until a next instance of raising or lowering is required. Another essential requirement for adjacently located seeding row units is to simultaneously be able to raise all of the seeding row units out of the ground, for times such as transporting the planter, crossing a wet or muddy patch in field, or crossing some barrier. Such multi-row crop planters have rockshafts that raise or lower the row units simultaneously which requires that entire frame of the multi-row crop planter is lifted to disengage the seeding row units from the soil. In other embodiments, the entire machine is raised and lowered which raises and lowers the row units simultaneously. In further embodiments, row units raised by a combination of such raising and lowering features are contemplated.

Even though the depth adjustment mechanism is used infrequently, the depth adjustment mechanism and its supporting apparatus adds cost to each of the seeding row units. What is needed therefore is a seeding row unit having a mechanism which is capable of varying the trench depth and also which lifts the seeding row unit off the ground with a common actuator.

SUMMARY

In one embodiment of the present disclosure, a row unit for depositing seeds in a furrow formed in soil includes a seed deposit assembly including a gage wheel and a disk, the gage wheel configured to contact a top surface of the soil and the disk configured to cut the furrow in the soil for receiving the deposited seeds; a multi-bar linkage assembly operatively connected to the seed deposit assembly; and a primary actuator operatively connected to the multi-bar linkage assembly, the primary actuator being controllably actuated between a retracted position and an extended position; wherein, the primary actuator raises and lowers the seed deposit assembly relative to the soil and moves the disk into the soil to cut the furrow at a depth determined by the primary actuator and the gage wheel.

In one example of this embodiment, the multi-bar linkage assembly comprises a four bar linkage. In a second example, the multi-bar linkage assembly comprises a main arm and a raise/lower link, the raise/lower link operatively coupled to the main arm and the primary actuator, and further wherein the primary actuator moves the raise/lower link with respect to the main arm to adjust the depth of the furrow. In a third example, a downforce actuator may be operatively coupled to the main arm, wherein the downforce actuator includes a resilient structure that follows the top surface of the soil such that the disk cuts the furrow at a relatively consistent depth. In a fourth example, a depth adjust link may be coupled to the main arm and operatively connected to the raise/lower link, wherein actuation of the primary actuator pivots the raise/lower link about a pivot shared between the raise/lower link and the main arm to move the depth adjust link to adjust the depth of the furrow.

In a fifth example, a connecting rod may be coupled between the depth adjust link and the raise/lower link; wherein, movement of the raise/lower link operatively moves the connecting rod for adjusting the position of the depth adjust link. In a sixth example, the raise/lower link comprises a limiting device, the limiting device being movable into contact with the main arm during actuation of the primary actuator to raise the seed deposit assembly from the soil. In a seventh example, a limit arm is operatively connected to one or both of the raise/lower link and the main arm, wherein the raise/lower link includes a slotted portion and the limit arm engages the slotted portion to define a limit to movement between the raise/lower portion and the main arm.

In an eighth example, actuation of the primary actuator moves the limit arm to one end of the slotted portion, and further actuation of the primary actuator, when the limit arm is at the one end of the slotted portion, moves the disk to a deeper location in the soil before raising the disk from the soil. In a ninth example, the row unit may include a push arm and a depth adjust linkage, wherein the raise/lower link includes a slotted portion and the depth adjust linkage engages the slotted portion to define a limit to movement between the raise/lower arm and the main arm. In a further example, actuation of the primary actuator moves a linkage limit arm of the depth adjust linkage to one end of the slotted portion, and further actuation of the primary actuator, when the linkage limit arm is at the one end of the slotted portion, raises from a furrow without initially moving the disk further into the soil.

In another embodiment of the present disclosure, a row unit for depositing seeds in a furrow formed in soil includes a seed deposit assembly including a gaging member and a cutting member, the gaging member configured to contact a top surface of the soil and the cutting member configured to cut the furrow in the soil for receiving the deposited seeds; a linkage assembly operatively connected to the seed deposit assembly; and a primary actuator operatively connected to the linkage assembly; wherein, the primary actuator is operably controlled to raise and lower the seed deposit assembly relative to the soil and adjustably control a depth at which the cutting member is located in the soil.

In one example of this embodiment, the linkage assembly comprises a multi-bar linkage. In a second example, the linkage assembly comprises a first link and a second link, the first link being operatively coupled between the second link and the primary actuator, wherein actuation of the primary actuator moves the first link to adjust the depth of the furrow. In a third example, a downforce actuator includes a resilient structure that follows the top surface of the soil such that the disk cuts the furrow at a relatively consistent depth. In a fourth example, a third link may be coupled to the second link and operatively connected to the first link, wherein actuation of the primary actuator pivots the first link relative to the second link to move the third link for controlling the depth at which the cutting member is located in the soil.

In a fifth example, the row unit may include a fourth link coupled between the first and third links, wherein, movement of the first link operatively moves the fourth link for adjusting the position of the third link. In a sixth example, the first link comprises a limiting device, the limiting device being movable into contact with the second link during actuation of the primary actuator to raise the seed deposit assembly from the soil. In a seventh example, a limit arm may be operatively connected to one or both of the raise/lower link and the main arm, wherein the raise/lower link includes a slotted portion and the limit arm engages the slotted portion to define a limit to movement between the raise/lower portion and the main arm. In an eighth example of this embodiment, actuation of the primary actuator moves the limit arm to one end of the slotted portion, and further actuation of the primary actuator, when the limit arm is at the one end of the slotted portion, moves the disk to a deeper location in the soil before raising the disk from the soil.

In a further embodiment of the present disclosure, a row unit for planting seed in soil includes a seed deposit assembly comprising a cutting member configured to form a furrow in the soil; a linkage assembly operatively connected to the seed deposit assembly; and an actuator operatively connected to the linkage assembly, where the actuator adjustably controls a distance between the seed deposit assembly and the soil and a depth at which the cutting member is located in the soil.

In one example of this embodiment, the linkage assembly may include a plurality of links operatively coupled between the actuator and the seed deposit assembly, the plurality of links including a first link rotatably coupled to the cutting member. In another example, the seed deposit assembly may include a gaging member configured to be moved into contact with a top surface of the soil. In yet another example, the cutting member comprises a first axle and the gaging member comprises a second axle, wherein a distance between the first axle and second axle controls the depth at which the cutting member is located in the soil. In a further example, the first link is operably coupled to the first axle for rotating the cutting member. In yet a further example, as the first axle is rotated, the distance between the first axle and second axle changes and the depth at which the cutting member is located in the soil is adjusted.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
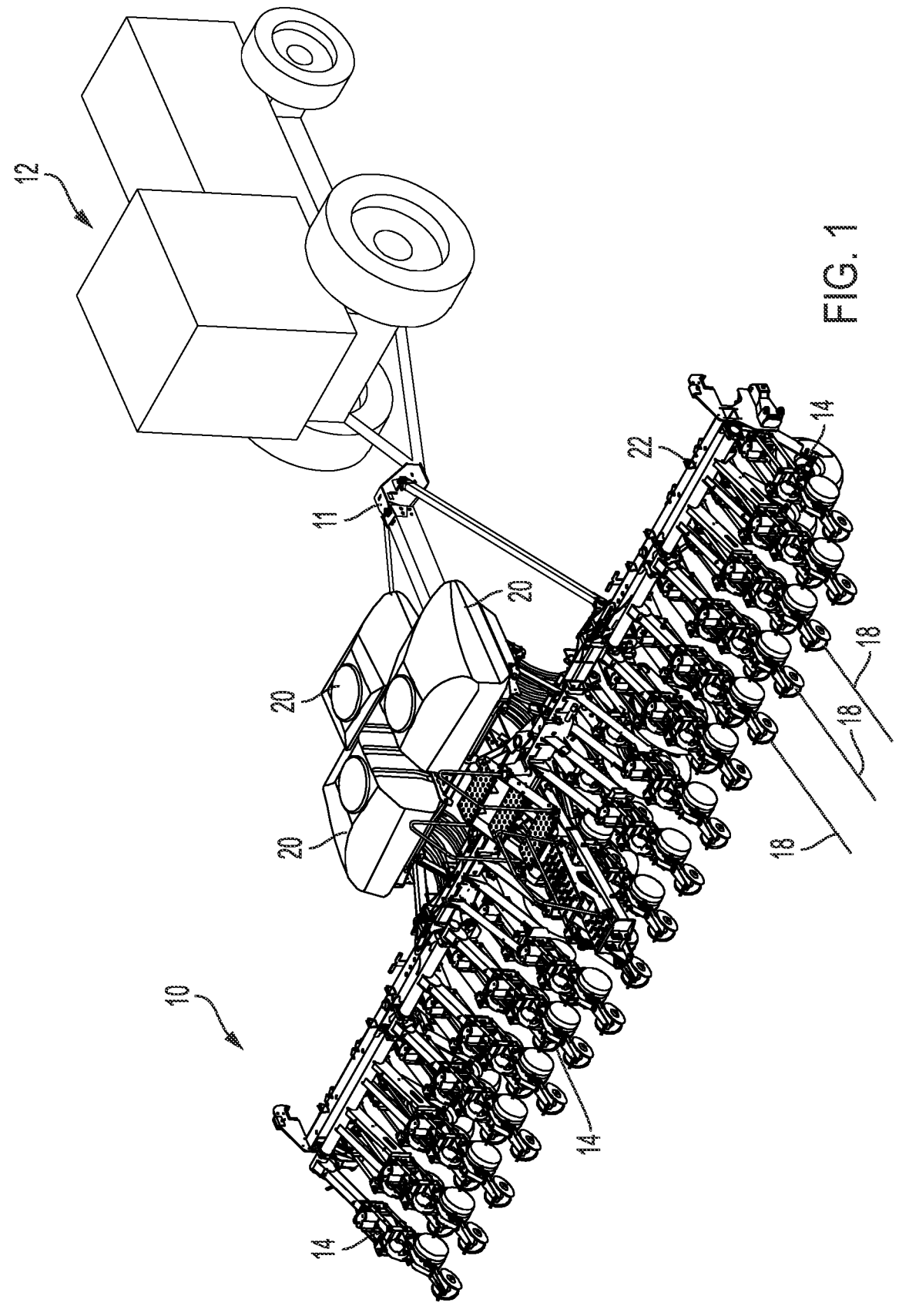
FIG. 1 is a perspective view of a row crop planter pulled by a work vehicle.

Referring to the drawings, and more particularly to FIG. 1, there is shown an embodiment of an agricultural seeder 10 of the present disclosure. In the embodiment shown, seeder 10 is in the form of a row crop planter but may also be in the form of a grain drill, etc. A work vehicle in the form of a tractor 12 may be coupled with and moves the seeder 10 with suitable coupling arrangement, such as a draw bar or 3-point hitch arrangement 11. Other embodiments are contemplated including an autonomous tractor pulling the seeder 10 as well as an entirely self-contained autonomous seeder in which the seeder, including the row units and a propulsion system for the seeder, are a complete and unitary seeding system.

Seeder 10 may include a number of row units 14, with each row unit 14 being substantially identically configured, in at least one embodiment. Each row unit 14 is configured to deposit seeds of varying sizes in respective furrows 18, not all of which are identified, in the soil for raising crops. In some embodiments, two or more of the row units 14 are configured to deposit seeds of different sizes. Typically, however, the size of the seeds being deposited is the same for each row unit 14. In other embodiments, seeds of different sizes may be deposited side by side in adjacent rows at different planting depths depending on the size of the seed.

A plurality of seed bins 20 may be operatively connected to each of the row units 14 and are configured to hold seeds for planting. In other embodiments, a single seed bin is used to supply seeds to all row units 14. In operation, each seed bin 20 may hold the same type of seeds or different types of seeds, which may be directed to each of the row units 14 as necessary. A tool bar 22 extends to and is coupled to each of the row units 14 to maintain a predetermined spacing between furrows 18. In some embodiments, a rockshaft may be located over or above the tool bar 22. In some embodiments, the spacing between row units is adjustable to provide for crops of different types that require spacing between furrows based on the type of seed.

Figure 2A:
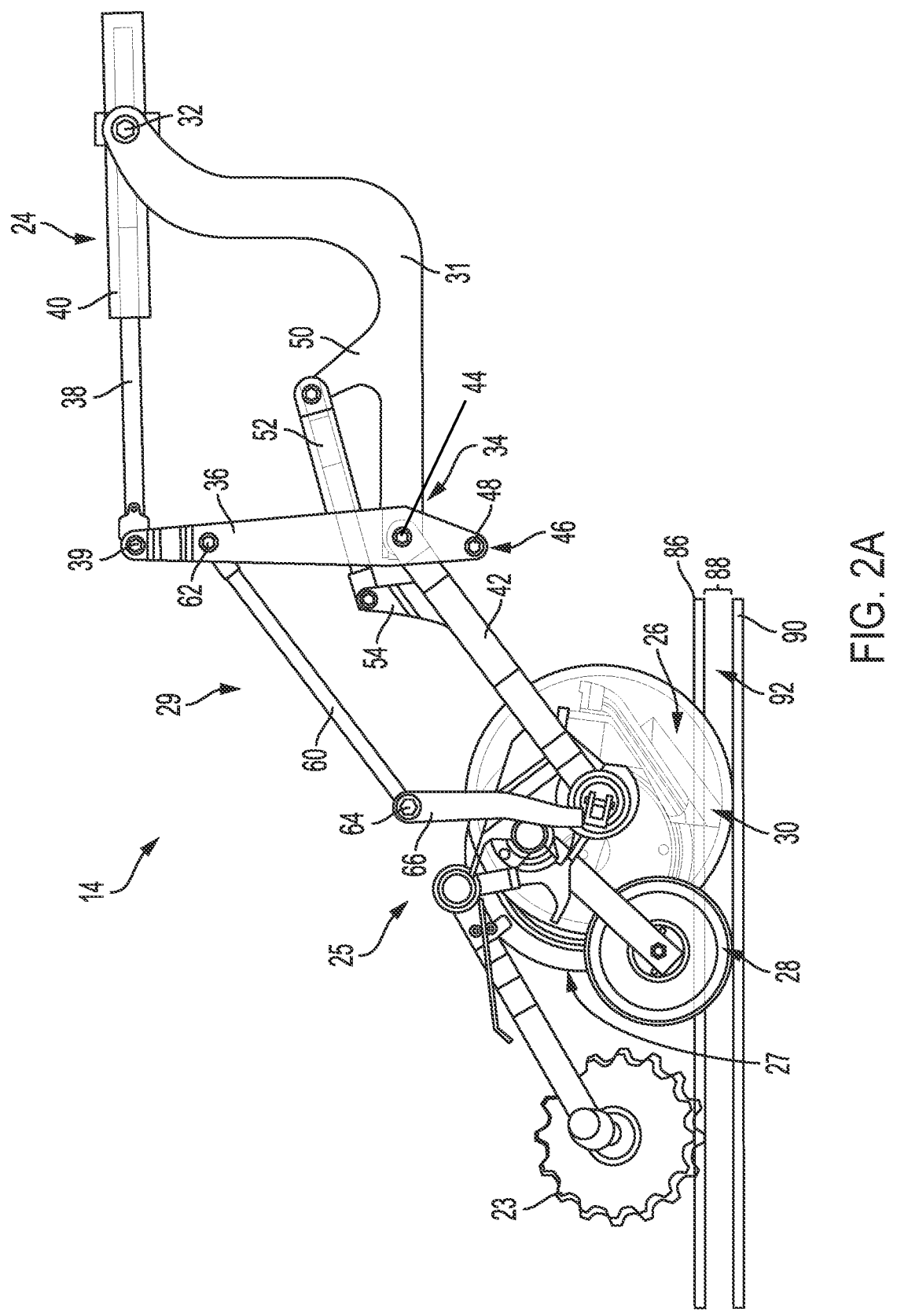
FIG. 2A is a side view of a row unit for seeding in a first position.

FIG. 2A illustrates one embodiment of one of the row units 14 depicted in FIG. 1. Here, the row unit 14 may include a primary actuator 24, which extends from the tool bar 22 (not shown). A planting depth may be determined by the primary actuator 24 pushing a disk 26, also known as a blade, shank, knife, or a cutting device or member, into the ground until a gage wheel 27, also known as a depth-gaging or surface following device or member, engages the soil. As described herein, the relationship of the gage wheel 27 to the disk 26 may be adjusted using the primary actuator 24. The primary actuator 24 raises and lowers the row unit 14 as well as controls the depth at which seeds are planted by the row unit 14. In this embodiment, movement of the primary actuator can adjust a seeding depth as well as raise and/or lower one of row units 14.

As shown, the primary actuator 24 may include an actuator arm 38 that is movable relative to a cylinder 40 or housing. The movement of the actuator arm 38 relative to the cylinder 40 may adjust a cutting depth of the row unit. In some embodiments, once the actuator arm 38 reaches a maximum depth, further retraction of the actuator arm 38, as shown in FIG. 2A, may raise the row unit 14 from the ground. Extension of the actuator arm 38, in addition to lowering the row unit 14 to the ground, also can set the depth at which the seeds are deposited in the soil and at which the furrow is cut.

In operation, the primary actuator 24 moves a seed deposit assembly 25, which includes the disk 26, the gage wheel 27, a press wheel 28, and a closing wheel 23, the functions of which are known by those of skill in the art. By collapsing and expanding a closed chain linkage 29. e.g., a multi-bar or bar linkage 29, with respect to or via the primary actuator 24, the seed deposit assembly 25 cuts a furrow and deposits seeds in the cut furrow with a seed deposit chute 30, as is also understood by those skilled in the art. The linkage 29 may be operatively connected to a mounting bracket 31 that is attached to a main frame (not shown) of the seeder 10. For example, the primary actuator 24 may be coupled to the mounting bracket 31 at a first portion or end 32 of the bracket 31. In some embodiments, the primary actuator 24 is coupled to the first portion or end 32 of the mounting bracket 31 at a pivot point. A second portion or end 34 of the mounting bracket 31 may be pivotally coupled to a raise/lower link 36 of the linkage 29. In some embodiments, the linkage 29 may include the raise/lower link 36, a main arm 42, a connecting rod 60, and a depth adjust link 66. The raise/lower link 36 raises and lowers the seed deposit assembly 25 as well as adjusts the depth of the disk 26. The raise/lower link 36 may also be pivotally coupled to the actuator arm 38 of the primary actuator 24 at a pivot location 39. In one embodiment, the raise/lower link 36 is one bar of a four bar linkage that is used by the linkage 29 to set the depth of the furrow and to raise and lower the seed deposit assembly 25.

The main arm 42 may be rotatably coupled to the mounting bracket 31 as well as the raise/lower link 36 at a pivot location 44. The pivot location 44 may be offset from a portion 46, e.g. end 46, of the raise/lower link 36.

Figure 2B:
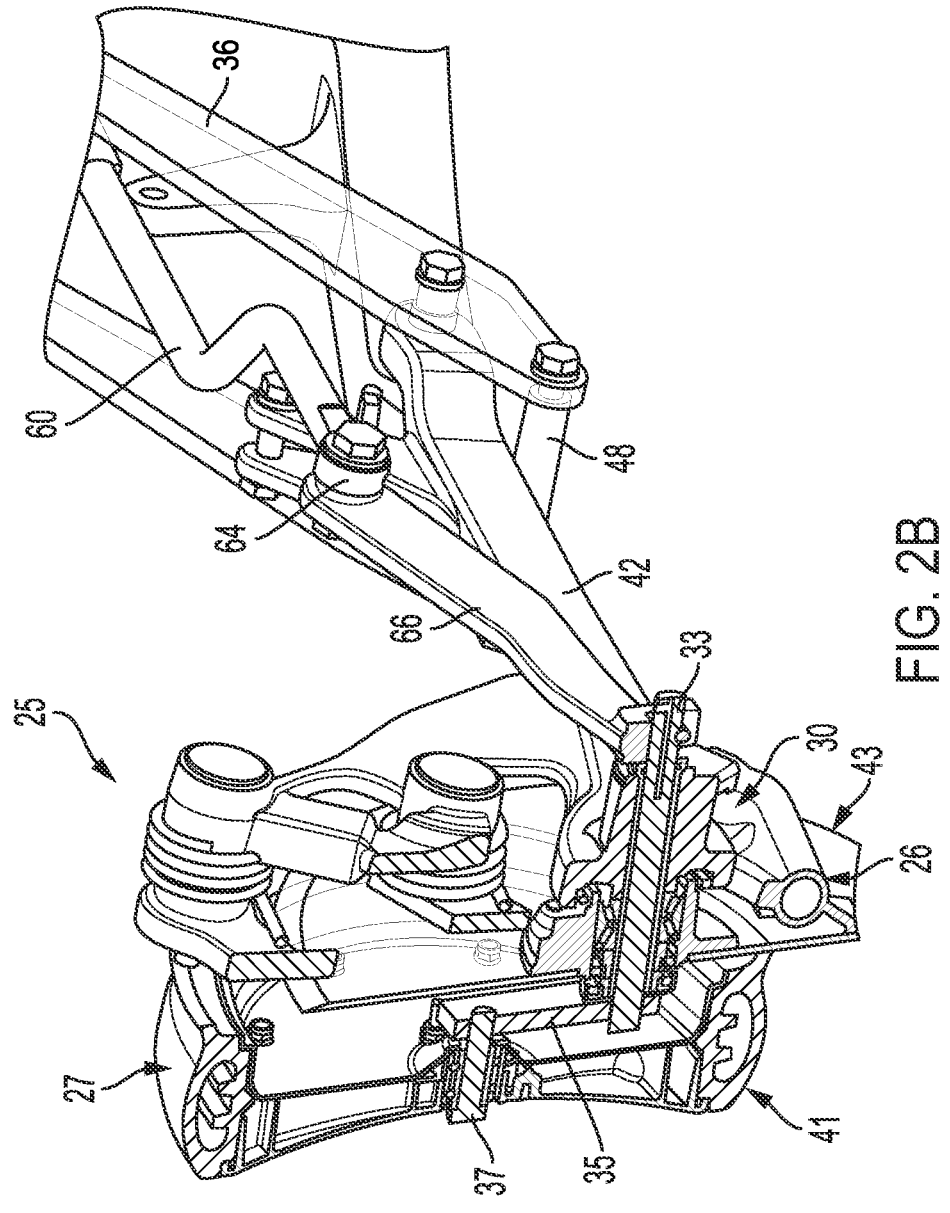
FIG. 2B is a perspective section view of a seed deposit assembly.

FIG. 2B illustrates further details of the seed deposit assembly 25 including a section view of the disk 26 and the gage wheel 27. A disk axle 33 is coupled to the depth adjust link 66. When actuated by the actuator arm 38, the depth adjust link 66 raises and lowers the disk 26 with respect to the soil, as well adjusts the depth at which the disk 26 is located in the soil. The disk axle 33 extends through the disk 26 to the gage wheel 27, to which disk axle 33 is connected, e.g., fixedly connected, by an arm 35 coupled to a gage wheel axle 37. The disk 26 is configured to rotate about an axis defined by the disk axle 33. The gage wheel 27 rotates about the gage wheel axle 37.

The depth adjust link 66 rotates the disk axle 33. As it does, a contact surface 41 of the gage wheel 27, which is configured to contact the soil, changes its location or moves with respect to a cutting surface 43 of the disk 26. The depth adjust link 66 rotates the axle 33, and the axle 33, which is coupled, e.g., fixedly coupled, to the arm 35, holds the gauge wheel axis 37 offset with respect to the disk 26. Therefore, rotation of the axle 33 by the link 66 changes the position of the gauge wheel axis 37 with respect to the axle 33. Consequently, the contact surface 41 of the gage wheel 27, which is in contact with the soil, determines the depth at which the cutting surface 43 of the disk 26 is placed in the soil. The depth of the furrow is therefore determined by how far the disk 26 penetrates the soil. The disk 26 may be forced into the soil by a downforce actuator 52, as shown in FIG. 2A.

The mounting bracket 31 may include a flange 50 that is pivotally connected to and supports one end or portion of the downforce actuator 52. A second end or portion of the downforce actuator 52 is pivotally coupled to a flange 54 extending from the main arm 42. The downforce actuator 52 is an actuator that applies a force directed away from the mounting bracket 31 to the main arm 42. This applied force moves the main arm 42 in a downward direction toward the soil such that the seed deposit assembly 25 engages the soil upon sufficient extension of the actuator arm 38. The main arm 42, coupled to the downforce actuator 52, forces the disk 26 into the ground until the gage wheel 27 engages the ground which limits any further penetration into the soil.

In other embodiments, the downforce actuator 52 may include a hydraulic cylinder, a spring, or a pneumatic actuator. The downforce actuator 52 may include a predetermined resilient structure configured to adjust to changes in the level of the top surface of the soil. The resilient structure may include a portion of the gage wheel 27 such as, but not limited to, its contact surface 41. Alternatively, the resilient structure may include a portion or surface on a gaging device, ski or skid pad. In this way, the disk 26, and therefore the seed deposit assembly 25, overcome the problem in which undulations in the field would necessarily cause variations in the furrow depth. Now, the linkage 29, e.g., the multi-bar or four-bar linkage, and the offset axes of the disk 26 and gage wheel 27 cut the furrow at substantially the same depth as the elevation of the top surface changes. The gage wheel 27, moving or following along the top surface of the ground "gages" the proper depth, according to the setting at which it is set, which is based on a position of the linkage 29, e.g., multi-bar or four bar linkage, including arms or links 36, 42, 60, and 66. As result of sufficient downforce provided by the downforce actuator 52, the depth of the furrow remains relatively consistent as the row unit 14 travels along the field even when the surface of the soil is uneven, contoured, or rolling. Since each row unit 14 includes its own downforce actuator 52, which applies a bias against the ground surface, furrow depth remains consistent side to side, i.e., from row to row, as well as along the length of the row.

The connecting rod or link 60 may include a first end or portion 62 pivotally connected to the raise/lower link 36 and a second end or portion 64 pivotally connected to the depth adjust link 66. The depth adjust link 66 extends between the connecting rod 60 and the main arm 42. In the illustrated embodiment of FIGS. 2A and B, the raise/lower link 36, the main arm 42, the connecting rod or link 60, and the depth adjust link 66 are configured as a four (4) bar linkage. The linkage 29 may be configured as a multi-bar linkage which is formed by two or more arms or links. In one such example, the linkage 29 may include four or more arms or links.

In the linkage 29 of FIGS. 2A and 2B, actuation of the raise/lower link 36 by the primary actuator 24 raises and lowers the seed deposit assembly 25 as well as sets the seed deposit assembly 25 at a level with respect to the surface of the soil to form a furrow of a substantially consistent depth as long as the extending distance of the arm 38 remains substantially fixed with respect to the cylinder 40, i.e., the actuator arm 38 does not extend or retract. In this embodiment, actuation of the arm 38 may cause the linkage 29, e.g., the four bar linkage, to rotate the raise/lower link 36. As this happens, the relationship between the contact surface 41 of the gage wheel 27 and the cutting surface 43 of the disk 26 changes, which in effect changes the depth of the trench being formed by the disk 26.

Figure 3:
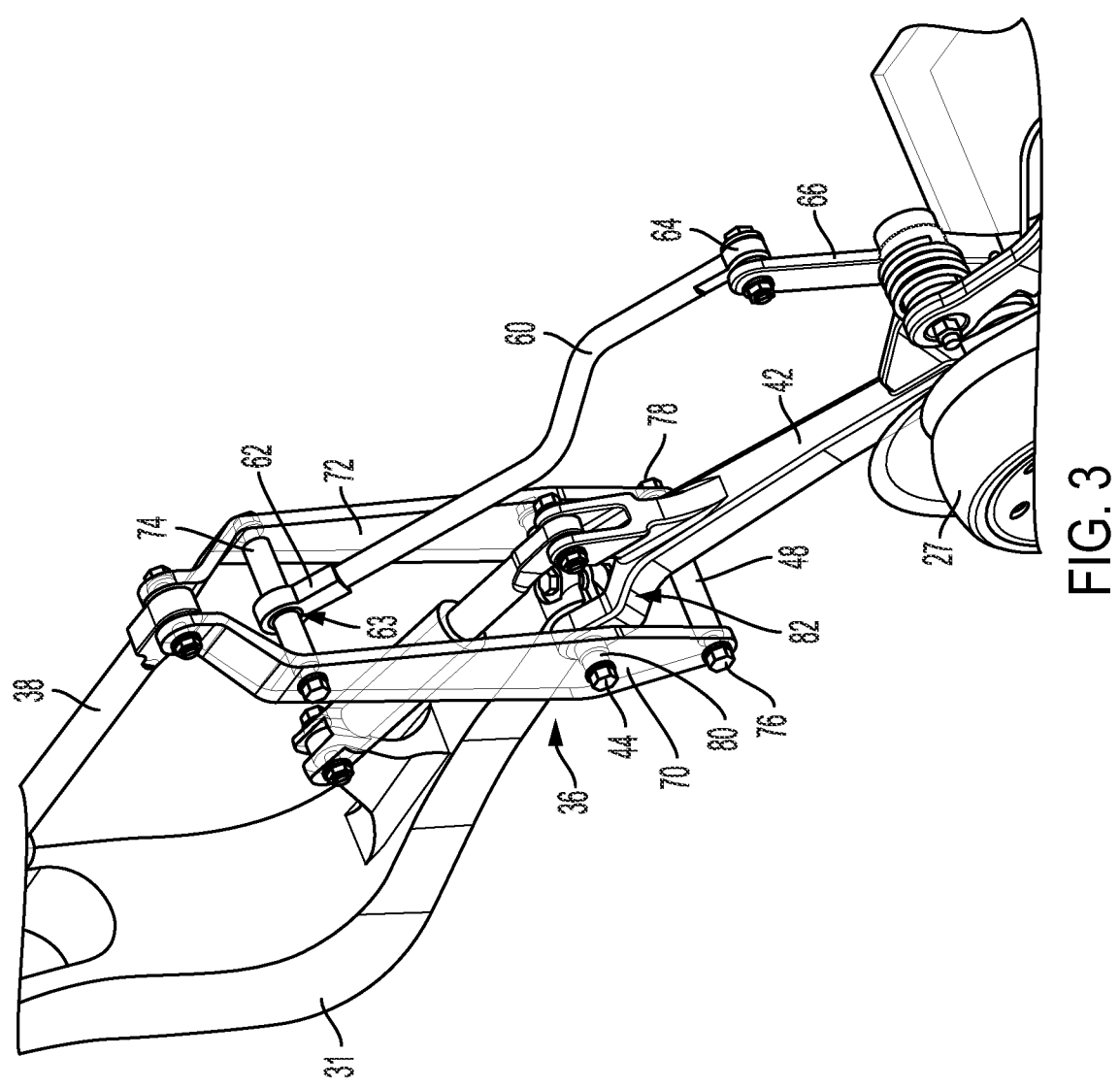
FIG. 3 is a perspective view of a portion of the row unit of FIG. 2A.

FIG. 3 shows a perspective view of a portion of the row unit 14 illustrating, in particular, a configuration of the raise/lower link 36. In this embodiment, the raise lower link 36 includes a first plate 70 spaced from a second plate 72 by a spacer pin 74. The spacer pin 74 extends from the first plate 70 to the second plate 72 and includes an outer generally cylindrical surface configured to rotatably receive the first end or portion 62 of the connecting rod 60. In one or more embodiments, a ball joint bearing 63 receives the spacer pin 74. The connecting rod 60, in at least one embodiment as illustrated in FIG. 3, is non-linear over its length to accommodate lowering and raising of the seed deposit assembly 25.

Figure 4:
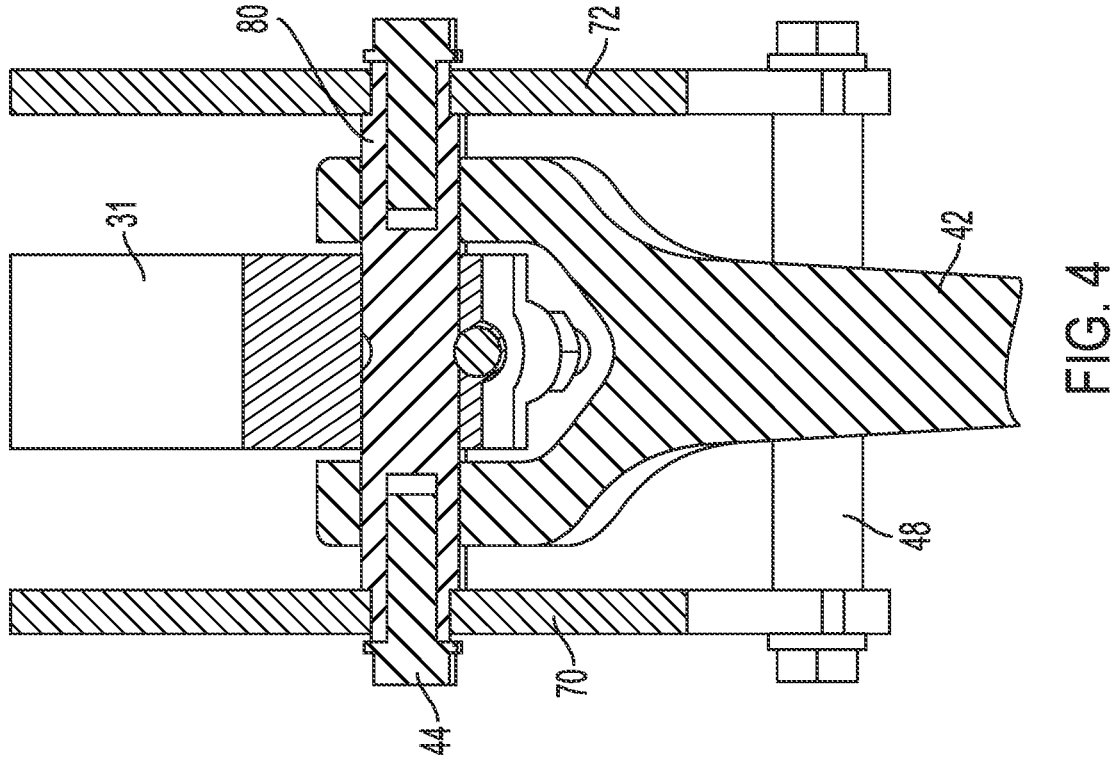
FIG. 4 is section view of a portion of the row unit of FIG. 2A.

As shown in FIGS. 2A, 2B, and 3, a limiting device 48 may extend between ends or portions 76 and 78 of the first plate 70 and the second plate 72. The limiting device 48 may include a mechanical limiting member such as a pin or stop. The function of the limiting device 48 is described in more detail below. Between the spacer pin 74 and the limiting device 48, there is provided a pivot bar 80 that extends between the first plate 70, through main arm 42, and the second plate 72. As shown in FIG. 4, the main arm 42 terminates in a Y-shaped portion 82 such that the second end or portion 34 of mounting bracket 31 is located between each leg of the Y-shaped portion 82. Consequently, the raise/lower link 36 and the main arm 42 may both rotate about the pivot bar 80.

The first end or portion 62 of connecting rod 60 may be rotatably connected to the spacer pin 74 and the second end or portion 64 may be rotatably connected to the depth adjust link 66. As the actuator arm 38 of the primary actuator 24 extends, the arm 35 rotates towards the surface of the soil thereby causing the disk 26 to move upward with respect to a top surface of the soil. Further extension of the arm 38 reduces the depth at which the furrow is cut.

Figure 5:
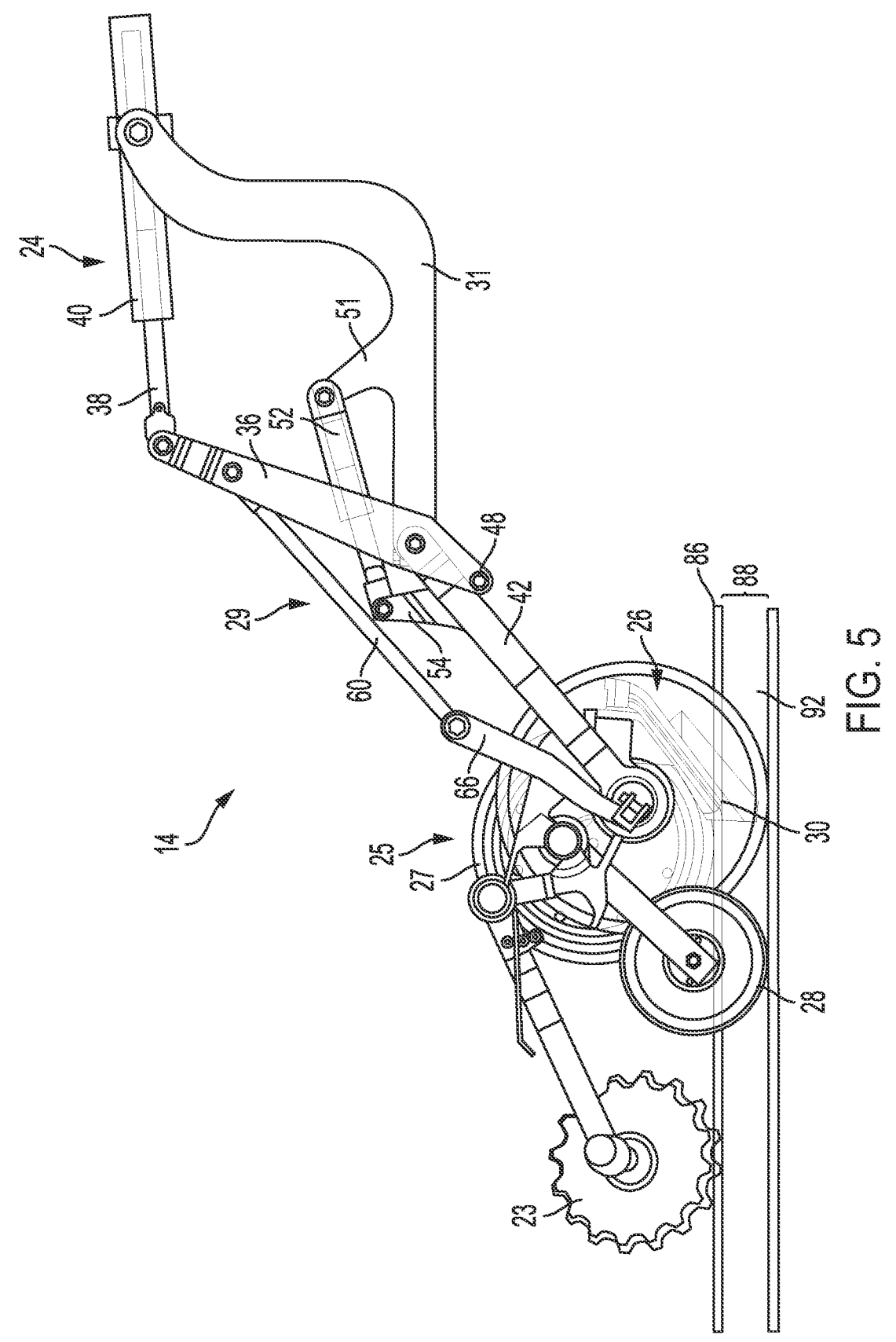
FIG. 5 is a side view of the row unit of FIG. 2A in a second position.

A depth 88, as shown in FIGS. 1 and 5, of the disk 26 may be determined by the extension of the actuator arm 38 such that the disk 26 penetrates a top surface 86 of the soil to a bottom surface 90 of a trench 92 formed by the disk 26. This depth 88 of the trench 92 is based on the relationship or offset distance between the contact surface 41 of the gage wheel 27 and the cutting surface 43 of the disk 26. At the same time during a furrowing or trenching operation, a downward pressure or force provide by the downforce actuator 52 directs the disk 26 into the soil at the depth determined by the retraction of the actuator arm 38.

Figure 6:
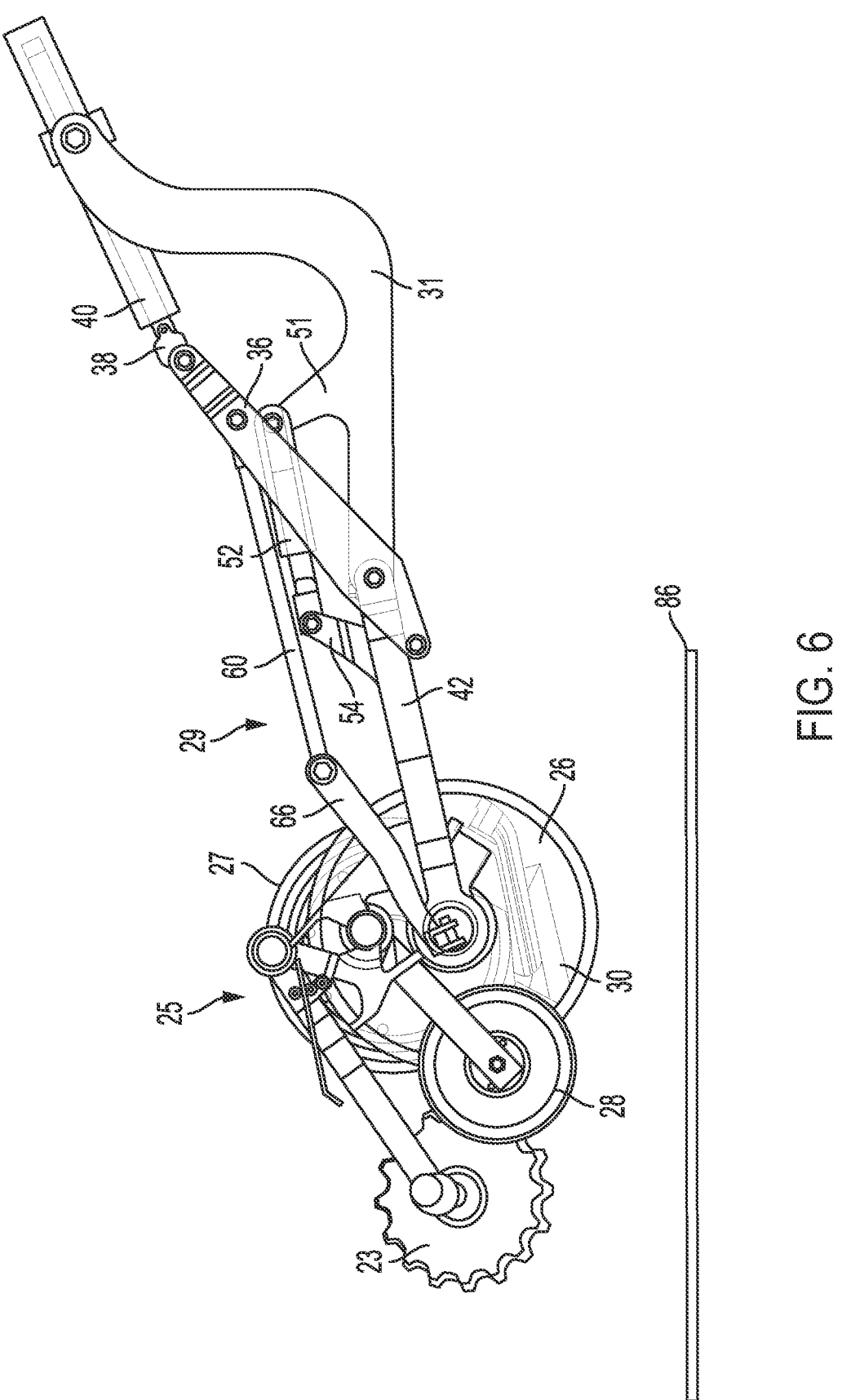
FIG. 6 is a side view of the row unit of FIG. 2A in a third position.

As shown in FIG. 5, the actuator arm 38 may be further retracted into the cylinder 40 compared to its position in FIG. 1. As a result, the disk 26 of the seed deposit assembly 25 may be lowered further into the ground by rotating the gage wheel 27 with respect to the disk 26. The depth of the furrow or trench 88 may be increased and thus greater than the depth of the furrow 88 shown in FIGS. 1 and 2A. As the actuator arm 38 continues to retract, the disk 26 of seed deposit assembly 25 further penetrates into the surface 86. Moreover, as the actuator arm 38 continues to be retracted, the main arm 42 may move into contact with the limiting device 48 as shown in FIG. 6. The limiting device 48 moves toward the main arm 42 until the main arm 42 contacts the limiting device 48. At this point of contact, the seed deposit assembly 25 may be lifted away or raised from the ground surface as the actuator arm 38 continues to retract. During this movement, the linkage 29 collapses, i.e., connect arm 60 moves into a closer proximity to the main arm 42, until the main arm 42 comes into contact with the limiting device 48. At this point, the linkage 29 and the seed deposit assembly 25 may be raised and moved away from the top surface 86 of the soil as shown in FIG. 6.

As described, the actuator arm 38 has a movement between various positions that results in different positioning of the seed deposit assembly 25 with respect to the soil. Between a fully extended position and a partially retracted position, the actuator arm 38 of the primary actuator 24 adjusts the depth at which the disk 26 penetrates the soil. At the partially retracted position, the disk 26 may be disposed at a maximum depth. However, upon further retraction of the actuator arm 38 from the partially retracted position to a fully retracted position, the seed deposit assembly 25, including the disk 26, is raised from the soil so that the row unit 14 may be configured in a transport configuration rather than a work or seeding configuration. The work or seeding configuration of the row unit 14 is shown in FIGS. 2-5, whereas the row unit is shown in a transport configuration in FIG. 6.

In one embodiment, one of the links, i.e., the raise lower link 36, of a parallelogram linkage 29 may include the limiter pin/stop 48 which engages with an adjacent link, i.e., the main arm 42, of the parallelogram linkage 29 at a certain parallelogram configuration, hence locking the parallelogram linkage 29. Any input or movement of the actuator 24, once the parallelogram locks, results in raising and lowering of entire row unit 14 as seen in FIG. 6. In this way, at least two functions, i.e., raising and lowering of the seed deposit assembly 25 and adjusting the depth of the disk 26 on a single row unit 14, may be accomplished by the primary actuator 24. Cost savings from each row unit 14 accumulates with the number of row units. For a larger machine having many row units, the cost savings resulting from this apparatus and method can be substantial.

Figure 7:
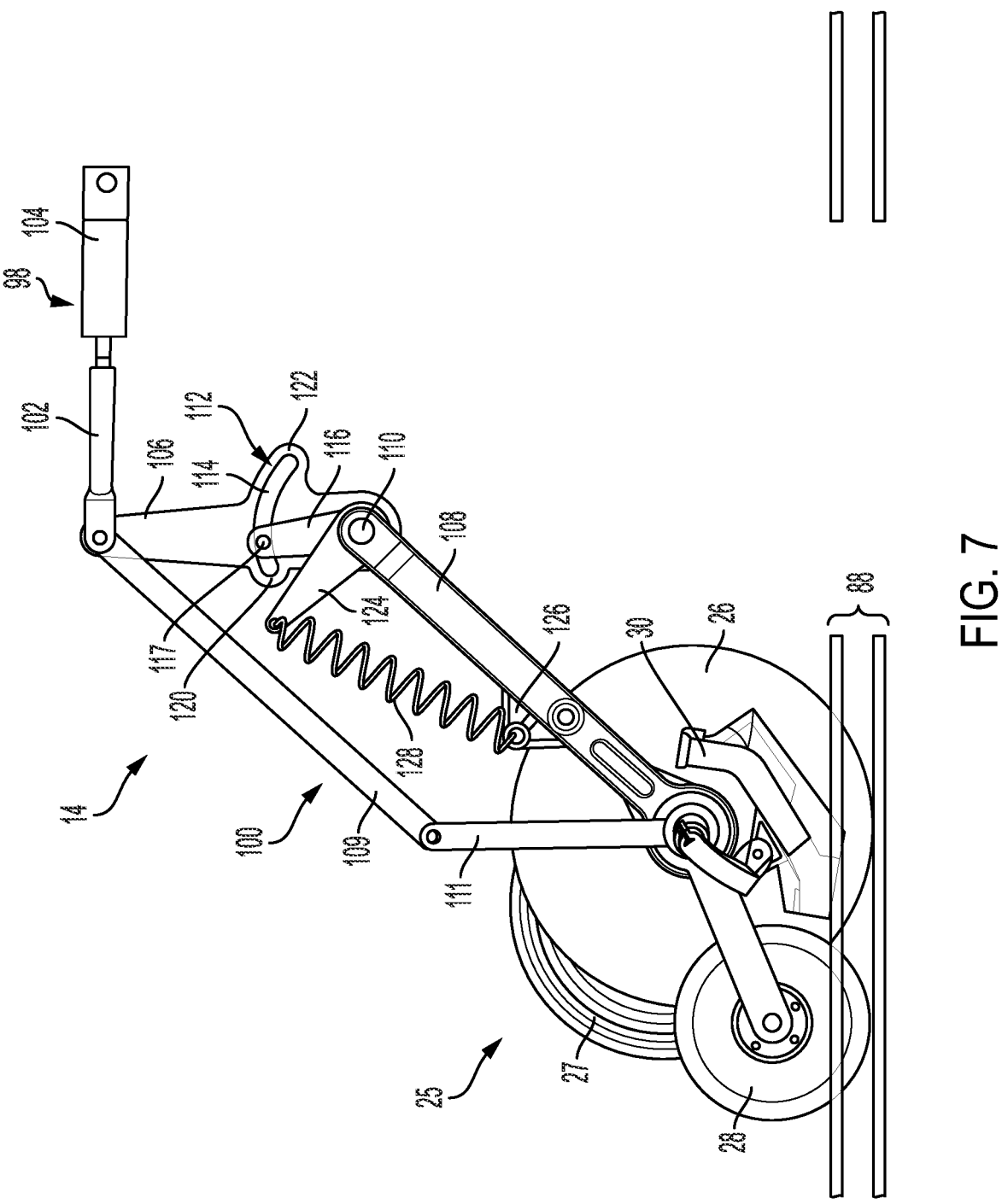
FIG. 7 is a side view of another embodiment of a row unit for seeding.

FIG. 7 illustrates another embodiment of a row unit 14 including the seed deposit assembly 25 as described above, but which does not include the closing wheel 23 for ease of illustration. A primary actuator 98 may be operatively connected to a linkage 100, e.g., a multi-bar or four bar linkage, and raises and lowers the seed deposit assembly 25 by extending and retracting an actuator arm 102 relative to a cylinder or housing 104 of the primary actuator 98. In this embodiment, the actuator arm 102 is operatively connected to one end or portion of a raise/lower arm 106, and another end or portion of the raise/lower arm 106 is pivotally connected to a main arm 108 at a pivot 110. Rotation of the raise/lower arm 106 with respect to the main arm 108 occurs at the pivot 110. The linkage 100 further includes a connecting arm 109 and a depth adjust link 111 similar to those described above with respect to FIGS. 2-6.

The raise/lower arm 106 may include a slotted portion 112 that includes a slot 114 which is generally curved, such as in an arc-like shape. In this embodiment, a limit arm 116 extends from the pivot 110 and includes an extension 117, such as a pin, that extends into the slot 114. The limit arm 116 may be fixed in position with the main arm 108 such that movement of the main arm 108 with the raise/lower arm 106 causes the extension of limit arm 116 to move from one end 120 of the slot 114, through the slot 114, to another end 122 thereof. Each of the ends 120 and 122 of the slot may limit further movement of the limit arm 116 and consequently further rotation of the main arm 108 with respect to the raise/lower arm 106.

A mounting bracket 124, in one embodiment, is located at or coupled to the main arm 108 at or near the pivot 110. The mounting bracket 124 may be fixed to the frame at the tool bar 22 (not shown), or to other locations such that the main arm 108 and the limit arm 116 each move with respect to the fixed location of the mounting bracket 124. A flange 126 may extend from and is coupled, e.g., fixed, to the main arm 108. A downforce actuator 128 may extend from the mounting bracket 124 to the flange 126 and apply a downforce to the seed deposit assembly 25 to cut a furrow 88 in the soil.

In this embodiment, when the actuator arm 102 is fully extended from the housing 104, the depth of a furrow 88 cut the by disk 26 is the shallowest. During this extension, the limit arm 116 is moved toward the second end 122 of the slot 114. As the arm 102 is retracted into the housing 104, the depth of the furrow becomes greater until the furrow 88 is at its greatest depth just before any additional or further retraction of the actuator arm 102 moves the extension 117 towards or into contact with the first end 120 of the slot 114. Upon contact of the extension 117 with the first end 120 of the slot 114, further retraction of the actuator arm 102 into the housing 104 raises the disk 126 from the bottom of the furrow 88 such that the disk 126 (and seed deposit assembly 25) is completely removed from the soil.

Figure 8:
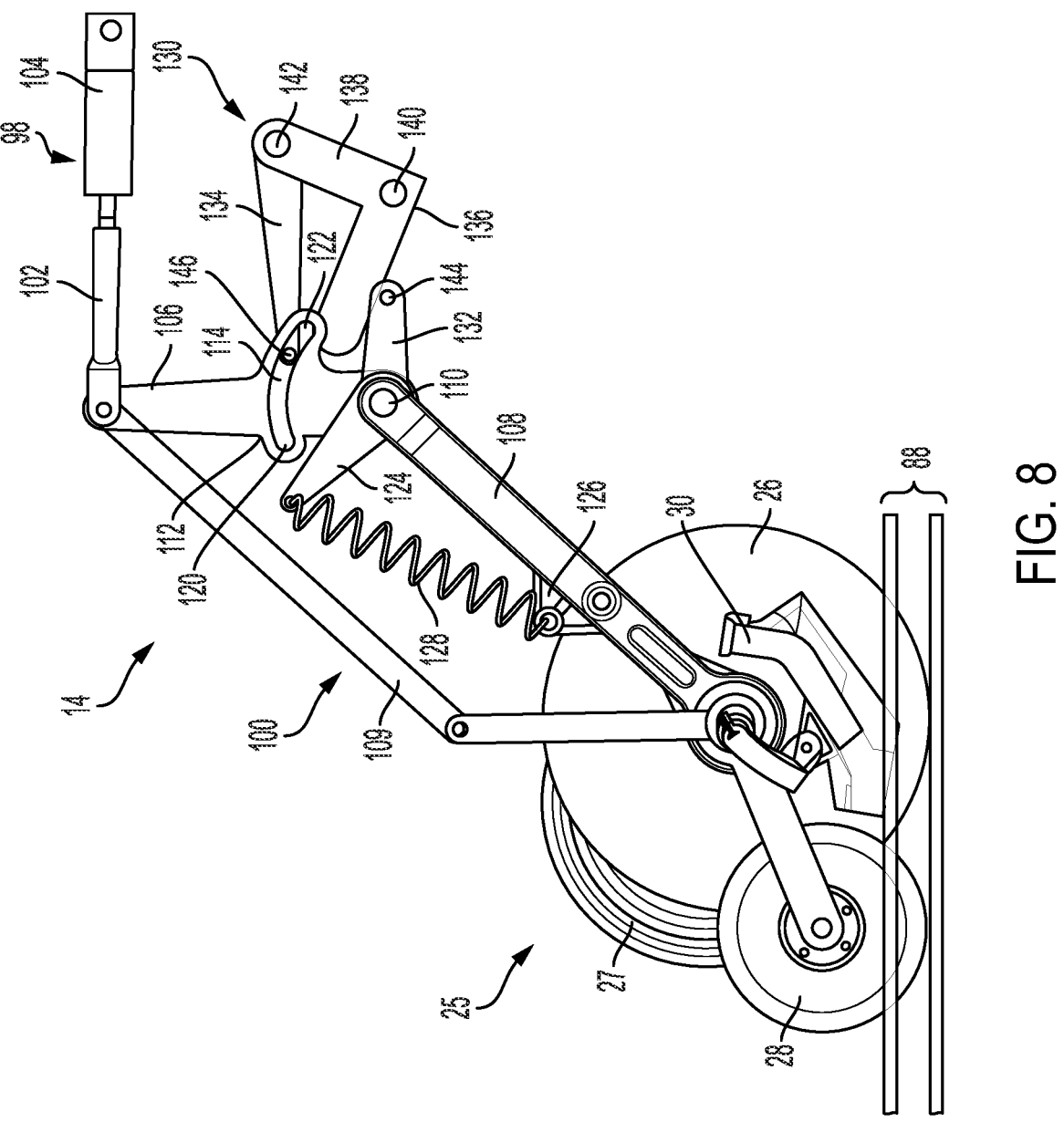
FIG. 8 is a side view of another embodiment of a row unit for seeding.

FIG. 8 illustrates another embodiment of the row unit 14 including the seed deposit assembly 25 as described above and shown in FIGS. 2A-B, but not including the closing wheel 23 for ease of illustration. FIG. 8 includes a number of the same elements as the embodiment of FIG. 7. In this embodiment, however, the limit arm 116 is replaced with a depth adjusting linkage 130 which may position the seed deposit assembly 25 based on the orientation or position of the linkage 130. In one embodiment, the depth adjusting linkage 130 is a bell crank linkage.

The raise lower link 106 may include the slotted portion 112 having the slot 114, which is similar to the embodiment of FIG. 7. In this embodiment, however, the limit arm 116 of FIG. 7 is replaced with the linkage 130. A push arm 132 may extend from the pivot 110 and is coupled, e.g., fixed, to the main arm 108 such that an angle between the push arm 132 and the main arm 108 may remain the same during rotation of the main arm 108 about the pivot 110. As the cylinder or actuator arm 102 extends and retracts relative to the cylinder 104, the main arm 108 and push arm 132 rotate. This rotation causes the push arm 132, which is operatively connected to the linkage 130, to change the configuration of the linkage 130 and a location of a linkage limit arm 134 with respect to the slot 114. The push arm 132 may include a pin 144 at an end furthest from the pivot 110 such that the pin 144 contacts the linkage 130, as described below.

The linkage 130 includes the linkage limit arm 134, and a first leg 136 connected, e.g., fixedly connected, to a second leg 138. The first leg 136 is coupled, e.g., fixed, to the second leg 138 at a point 140 such that the position of the first leg 136 relative to the second leg 138 remains at a predetermined angle of about 90 degrees, as illustrated. Other angles therebetween, however, may be possible in alternative embodiments including, but not limited to less than 90 degrees or more than 90 degrees. The point 140 may be rotatably coupled to a frame or other supporting structure such that the first let 136 and second leg 138 rotate about the point 140. The linkage limit arm 134 may be rotatably coupled to the second leg 138 at a pivot 142, e.g. pivot location. The push arm 132 may be slidingly engaged to the first arm 136 at the pin 144. As the push arm 132 moves in response to the extension and retraction of the actuator arm 102, a pin 146 located at one end or portion of the linkage limit arm 134 moves along the slot 114 from one end 120 of the slot 114 to another end 122.

In the configuration of FIG. 8, a minimum or partial extension of the actuator arm 102 may locate or position the disk 26 at its maximum depth in the soil. In other words, the actuator arm 102 may move between a first position corresponding to a fully retracted position and a second position corresponding to a fully extended position. At a third position referred to above as the minimum or partial extension, the actuator arm 102 is located between the first and second positions. It is at this third position the disk 26 is at its maximum depth in the soil. As the actuator arm 102 is extended from this third position, the depth of the disk 26 is decreased until the pin 146 contacts the end 122. Further extension of the actuator arm 102 raises the disk 26 from the soil.

Figure 9:
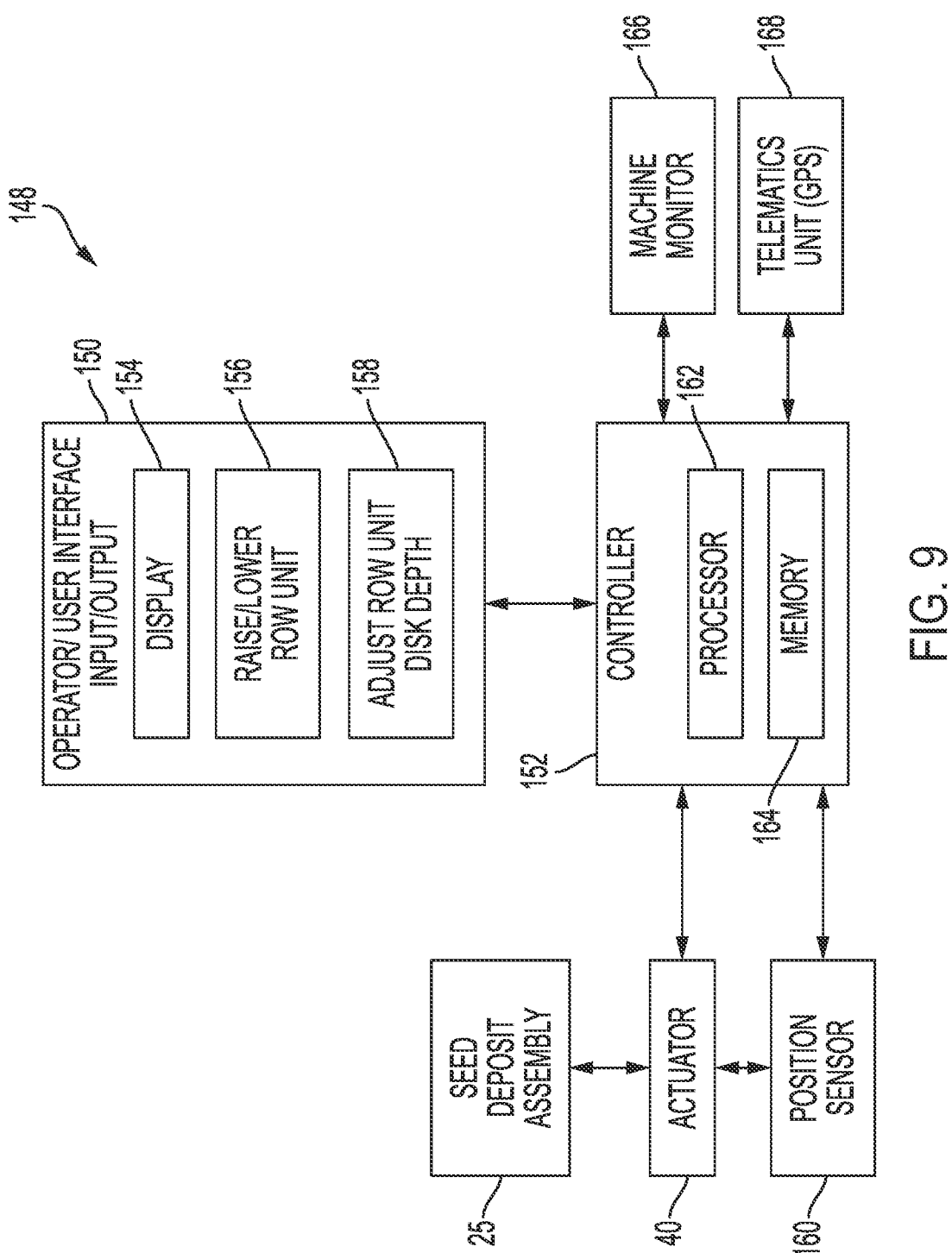
FIG. 9 is a block diagram of a control system for depositing seeds.

Referring to FIG. 9, a seeder or seeding implement 10 may include a plurality of row units 14, each of which includes its own seed deposit assembly having a cutting disk 26 or blade. To establish the depth of each disk 26 of each seed deposit assembly 25, the vehicle 12 or implement 10 may include a control system 148 having an operator/user interface 150 operatively connected to a controller 152 as seen in FIG. 9. The control system 148 is configured to adjust the position of the tool bar 22 to raise all of the seed deposit assemblies 25 at the same time for transporting the seeder 10, and to lower all of the seed deposit assemblies 25 for a seeding operation. The interface 150 may include a display 154 to display a current status of the tool bar 22, such as its position in either the raised position or lowered position, and a raise/lower row unit control device 156 that is actuated by the operator, either in a cab of the vehicle or remotely, to either raise or to lower the tool bar 22. An adjust row unit disk depth control device 158 sets the depth of each furrow being cut by the disks 26. To determine the depth of the furrow, a position sensor 160 may be operatively connected to the controller 152 to transmit a depth signal indicative of the furrow depth. In one embodiment, the depth of the furrow is displayed on the display 154 to indicate to the operator that the selected row unit depth selected by control device 158 is being achieved. Each of the seed deposit assemblies 25 and/or row units 14 may include, in at least one embodiment, a position sensor 160. In other embodiments, only one position sensor 160 is used if all of the seed deposit assemblies are adjusted to the same depth.

In some embodiments, seeds of different types are deposited simultaneously along one or more rows and furrows of different depths are formed depending on the seed type. In this embodiment, each of the primary actuators 40, 104 are individually controllable to cause seed deposit assemblies 25 to cut furrows of different depths. In other embodiments, two or more actuators 40, 104 may be actuated independently but simultaneously. Furrow depths can be determined based on seed type, as well as by soil and/or environmental conditions.

To achieve the desired furrow depth, the controller 152, in one or more embodiments, includes a computer, computer system, or other programmable devices. In these and other embodiments, the controller 152 includes one or more of the processors 162 (e.g., microprocessors). An associated memory 164 can be internal or external to the processor(s) 162. The memory 164 includes, in different embodiments, random access memory (RAM) devices comprising the memory storage of the controller 152, as well as any other types of memory, e.g., cache memories, non-volatile or backup memories, programmable memories, or flash memories, and read-only memories. In addition, the memory 164 can include a memory storage physically located elsewhere from the processing devices, and can include any cache memory in a processing device, as well as any storage capacity used as a virtual memory, e.g., as stored on a mass storage device or another computer coupled to controller 152. The mass storage device can include a cache or other dataspace which can include databases.

Memory storage, in other embodiments, may be located in a cloud system, also known as the "cloud", where the memory is located in the "cloud" at a remote location from the work machine or implement to provide the stored information wirelessly to the controller 152 through an antenna operatively connected to a transceiver (not shown), which is operatively connected to the controller 152. When referring to the controller 152, the processor 162, and the memory 164, other known types of controllers, processors, and memory are contemplated in this disclosure.

In one embodiment, the controller 152 executes or otherwise relies upon computer software applications, components, programs, objects, modules, or data structures, etc. Software routines resident in the included memory 162 of the controller 152, or other memory, are executed in response to the signals received from the position sensor(s) 160, each of which provides a signal to the controller 152.

A machine monitor 166, in different embodiments, is included to monitor the operating conditions of the tractor 12 as well as the seeder 10. For instance, the flow rate of seeds delivered from the seed bins 20 is determined. In different embodiments, other conditions of the machine, such as tractor speed, are monitored to determine the spacing of seed being deposited.

A telematics unit 168, such as a global positioning system (GPS) unit is operatively connected to the controller 152 and, in different embodiments, transmits and receives information to and from the controller 152. In one embodiment, the information being transmitted is informational as to the quantity of seeds contained in the seed bins 20. In other embodiments, such as a remotely controlled seeder, the telematics unit receives control information, such as row unit depth from a remote control station.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A row unit for depositing seeds in a furrow formed in soil, the row unit comprising:
   a seed deposit assembly including a gage wheel and a disk, the gage wheel configured to contact a top surface of the soil and the disk configured to cut the furrow in the soil for receiving the deposited seeds, a disk axle of the disk fixedly connected by an arm to a gage wheel axle of the gage wheel;
   a multi-bar linkage assembly operatively connected to the seed deposit assembly, the multi-bar linkage assembly comprising a main arm, a raise/lower link, and a depth adjust link, the depth adjust link coupled to the disk axle, the raise/lower link being pivotally coupled to the main arm at a first pivot location;
   a primary actuator operatively connected to the multi-bar linkage assembly, the primary actuator being controllably actuated between a retracted position and an extended position, a first end of the raise/lower link being pivotally coupled to the primary actuator; and
   wherein the raise/lower link comprises a limiting device positioned between the first pivot location and a second end of the raise/lower link, the limiting device being positioned to, as a depth of the disk in the soil is adjusted, be movable into contact with the main arm as the raise/lower link is rotated in a first direction with retraction of the primary actuator, and wherein further rotation of the raise/lower link in the first direction by retraction of the primary actuator with the limiting device in contact with the main arm lifts the seed deposit assembly relative to the soil;
   wherein the disk axle is rotated by a rotation of the depth adjust link in response to an actuation of the primary actuator, and
   wherein the arm is rotated by a rotation of the disk axle to adjust a position of the gage wheel relative to the disk axle to adjust a depth the disk cuts the furrow into the soil.

2. The row unit of claim 1 wherein the multi-bar linkage assembly comprises a four bar linkage.

3. The row unit of claim 1, wherein the primary actuator moves the raise/lower link with respect to the main arm to adjust the depth of the furrow, and wherein the disk rotates about an axis defined by the disk axle.

4. The row unit of claim 3, further comprising a downforce actuator operatively coupled to the main arm, wherein the downforce actuator is configured to adjust to changes in the top surface of the soil such that the disk cuts the furrow at a relatively consistent depth.

5. The row unit of claim 3, wherein actuation of the primary actuator pivots the raise/lower link about a pivot shared between the raise/lower link and the main arm to move the depth adjust link to adjust the depth of the furrow.

6. The row unit of claim 5 wherein the multi-bar linkage assembly further comprises a connecting rod coupled between the depth adjust link and the raise/lower link;
   wherein, movement of the raise/lower link operatively moves the connecting rod for adjusting the position of the depth adjust link.

7. A row unit for depositing seeds in a furrow formed in soil, comprising:
   a seed deposit assembly including a gaging member and a cutting member, the gaging member configured to contact a top surface of the soil and the cutting member configured to cut the furrow in the soil for receiving the deposited seeds, a disk axle of the cutting member fixedly connected by an arm to a gage wheel axle of the gaging member, a rotation of the disk being about an axis defined by the disk axle;

a linkage assembly operatively connected to the seed deposit assembly, the linkage assembly comprising a first link, a second link, and a limiting device; and a primary actuator operatively connected to the linkage assembly, the limiting device being movable into contact with the linkage assembly as a depth of the cutting member in the soil is adjusted as the first link is rotated in a first direction by a retraction of the primary actuator, the first link being operatively coupled between the second link and the primary actuator;

a downforce actuator configured to adjust to changes in the top surface of the soil such that the disk cuts the furrow at a relatively consistent depth;

wherein the primary actuator is operably controlled to raise and lower the seed deposit assembly relative to the soil;

wherein the disk axle is rotated by a rotation of the linkage assembly in response to an actuation of the primary actuator, wherein rotation of the disk axle rotates the arm to adjust a position of the gaging member relative to the disk axle to adjustably control a depth at which the cutting member is located in the soil, wherein, upon the limiting device contacting the linkage assembly, further rotation of the first link by continued retraction of the primary actuator lifts the seed deposit assembly relative to the soil without further increasing the trench depth, and wherein actuation of the primary actuator moves the first link to adjust the depth of the furrow.

8. The row unit of claim 7 wherein the linkage assembly comprises a multi-bar linkage.

9. The row unit of claim 7 further comprising a third link coupled to the second link and operatively connected to the first link, wherein actuation of the primary actuator pivots the first link relative to the second link to move the third link for controlling the depth at which the cutting member is located in the soil.

10. The row unit of claim 9 further comprising a fourth link coupled between the first and third links, wherein, movement of the first link operatively moves the fourth link for adjusting the position of the third link.

11. The row unit of claim 10 wherein the first link comprises a limiting device, the limiting device being movable into contact with the second link during actuation of the primary actuator to raise the seed deposit assembly from the soil.

12. A row unit for planting seed in soil, comprising:

a seed deposit assembly comprising a cutting member configured to form a furrow in the soil and a gaging member, a first axle of the cutting member fixedly connected by an arm to a second axle of the gaging member;

a linkage assembly operatively connected to the seed deposit assembly, the linkage assembly coupled to the disk axle; and an actuator operatively connected to the linkage assembly, where the actuator adjustably controls a distance between the seed deposit assembly and the soil and a depth at which the cutting member is located in the soil, wherein the disk axle is rotated by the linkage assembly in response to the actuator being displaced to an extended position to rotate the arm and gage wheel axis toward the soil, thereby lowering the gage wheel and reducing the depth at which the cutting member is located in the soil.

13. The row unit of claim 12, wherein the linkage assembly comprises a plurality of links operatively coupled between the actuator and the seed deposit assembly, the plurality of links including a first link rotatably coupled to the cutting member.

14. The row unit of claim 13, wherein the seed deposit assembly comprises a gaging member configured to be moved into contact with a top surface of the soil.

15. The row unit of claim 14, wherein the cutting member rotates about the first axle and the gaging member rotates about the second axle, wherein a change in an angular position of the second axle relative to the first axle via rotation of the arm adjusts the depth at which the cutting member is located in the soil.

16. The row unit of claim 15, wherein the first link is operably coupled to the first axle for rotating the first axle and the arm and the angular position of the second axle.

17. The row unit of claim 16, wherein as the first axle is rotated, the distance between the soil changes and the depth at which the cutting member is located in the soil is adjusted.

* * * * *